United States Patent [19]

King et al.

[11] 4,354,249
[45] Oct. 12, 1982

[54] PROCESSING UNIT FOR MULTIPLYING TWO MATHEMATICAL QUANTITIES INCLUDING AT LEAST ONE COMPLEX MULTIPLIER

[75] Inventors: Thomas M. King, Mesa; Sam M. Daniel, Tempe, both of Ariz.

[73] Assignee: Motorola Inc., Schaumburg, Ill.

[21] Appl. No.: 132,963

[22] Filed: Mar. 24, 1980

[51] Int. Cl.³ .............................................. G06F 7/52
[52] U.S. Cl. ................................................... 364/754
[58] Field of Search ........................ 364/754, 757, 728

[56] References Cited

U.S. PATENT DOCUMENTS

| 3,800,130 | 3/1974 | Martinson et al. | 364/757 X |
| 3,803,390 | 4/1974 | Schaepman | 364/754 X |
| 3,926,367 | 12/1975 | Bond et al. | 364/754 X |
| 4,086,657 | 4/1978 | Gaskill, Jr. et al. | 364/757 |
| 4,202,039 | 5/1980 | Epenoy et al. | 364/757 |

Primary Examiner—David H. Malzahn
Attorney, Agent, or Firm—Eugene A. Parsons

[57] ABSTRACT

The processing unit includes at least one complex multiplier having hour multiplying circuits for multiplying the real and imaginary components of two complex vectors and combining the products to produce a complex output vector. Representing the input complex vectors by $(A+jB)$ and $(C+jD)$ the output complex vector becomes $(AC-BD)+j(BC+AD)$. The combining circuits can be switched so that one of the input complex vectors is conjugated and the output complex vector becomes $(AC+BD)+j(BC-AD)$. Thus, the present processing unit can provide the dot product of two complex vectors or the like.

6 Claims, 4 Drawing Figures

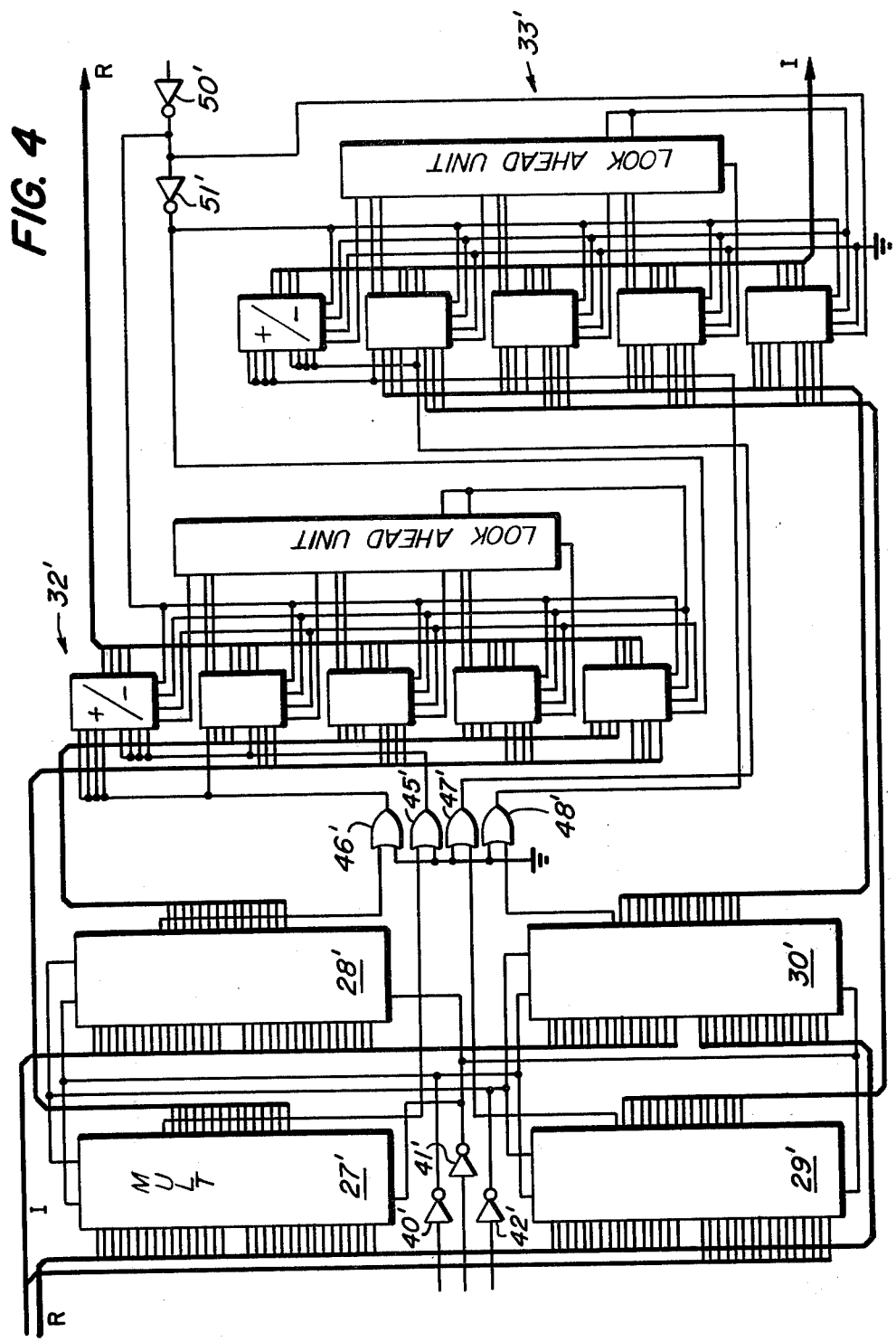

PROCESSING UNIT FOR MULTIPLYING TWO MATHEMATICAL QUANTITIES INCLUDING AT LEAST ONE COMPLEX MULTIPLIER

BACKGROUND OF THE INVENTION

In many instances computations require the multiplying of mathematical quantities such as two complex vectors, a real scalar and a complex vector, a complex scalar and a complex vector, and/or a complex matrix and a complex vector. It is of course understood that a complex vector consists of a real portion and an imaginary portion and that each row of a complex matrix is a complex vector. The multiplying of mathematical quantities is especially useful when working with complex N-vectors wherein the N represents a positive integer greater than zero. To-date, no processing unit is known wherein a dot product between two complex N-vectors can be computed.

SUMMARY OF THE INVENTION

The present invention pertains to a processing unit for multiplying two mathematical quantities including at least one complex multiplier which has four multiplier circuits connected to receive electrical signals representative of the real and imaginary components of each of the mathematical quantities, which mathematical quantities and components can be represented by the statements $(A+jB)$ and $(C+jD)$, the outputs at the four multipliers being represented by the products $AC$, $BD$, $AD$ and $BC$, and means for combining the four products to provide a complex output represented by the statement $(AC-BD)+j(BD+AD)$ or, upon the operation of switching apparatus, the conjugate of one of the complex input quantities may be utilized to produce the output statement $(AC+BD)+j(BC-AD)$.

It is an object of the present invention to provide a new and improved processing unit for multiplying mathematical quantities and especially complex vectors.

It is a further object of the present invention to provide a processing unit for multiplying two N-component complex vectors.

It is a further object of the present invention to provide a new and improved processing unit capable of providing output signals representative of the product of a complex vector and a conjugate of a second complex vector.

These and other objects of this invention will become apparent to those skilled in the art upon consideration of the accompanying specification, claims and drawings.

BRIEF DESCRIPTION OF THE DRAWINGS

Referring to the drawings, wherein like characters indicate like parts throughout the Figures:

FIG. 4 is a more detailed schematic of one of the complex multipliers of the apparatus illustrated in FIG. 3.

DESCRIPTION OF THE PREFERRED EMBODIMENT

Figure 1:
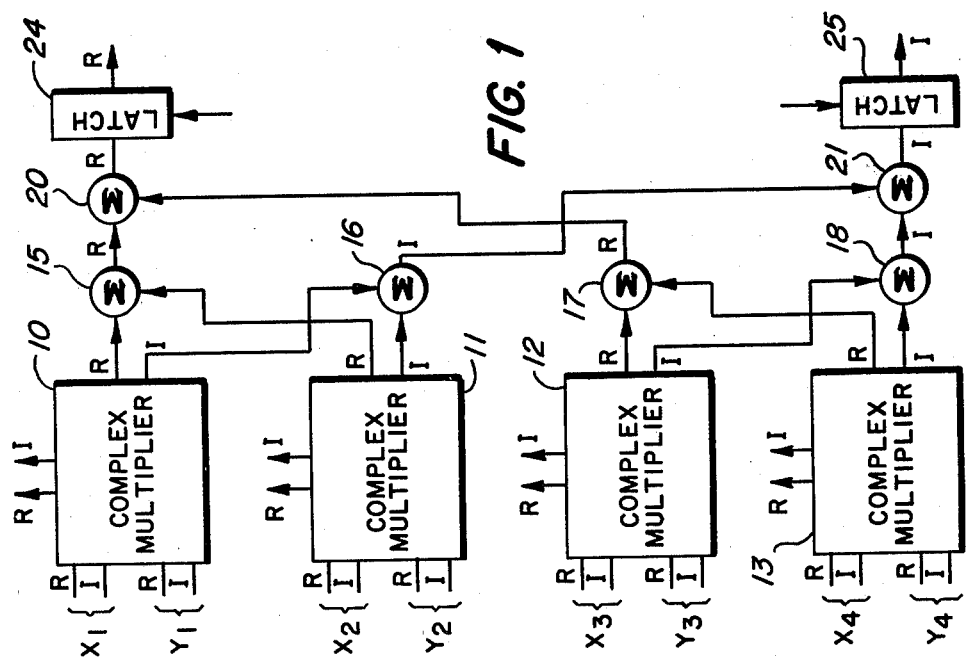
FIG. 1 is a block diagram of a processing unit embodying the present invention.

Referring specifically to FIG. 1, a processing unit is illustrated for multiplying mathematical quantities such as two N-component complex vectors, X and Y. In this embodiment the number, N, of components in the complex vectors X and Y is 4. Thus, four complex multipliers 10, 11, 12 and 13 are illustrated. Each of the complex multipliers 10 through 13 are connected to receive a component of each of the complex vectors X and Y. Throughout FIGS. 1 and 2, single lines are illustrated as inputs, outputs and connections between the various components and it will be understood by those skilled in the art that these lines might represent a plurality, m, of leads for carrying a plurality of parallel bits in a digital embodiment. If speed is not a requirement the lines might be single lines for carrying serial bits or analog signals.

Each of the components of the complex vectors X and Y include a real portion (designated R in the FIGS.) and an imaginary portion (designated I in the FIGS.). Each complex multiplier 10 through 13 receives a different X and Y component at the X and Y inputs thereof, performs a dot product multiplication and provides the answer, which is a complex vector, at the output thereof in the form of signals on real and imaginary output leads. In the present embodiment each of the complex multipliers 10 through 13 has two outputs, one of which is adapted to be connected to further circuitry for direct use and the other of which is connected to summing circuitry which will be explained presently. When the processing unit is utilized to obtain the dot product of two complex vectors, or the squared magnitude of a complex vector, the output of each of the complex multipliers 10 through 13 is supplied to the summing circuitry to be described presently. However, the processing unit may also be used to obtain the real-scalar multiplication of a complex vector in which case the summing circuits are bypassed and the output is taken directly from the complex multipliers 10 through 13. It should be noted that the output of a real-scalar multiplication of a complex vector is also available at the outputs of the summing circuits if desired. If a complex scalar and a complex vector are multiplied in the processing unit the output must be taken after summing circuits which will be described in conjunction with FIG. 2.

The real portion of the complex output of the multipliers 10 and 11 is connected to a summing device 15. The imaginary portion of the complex output of the multipliers 10 and 11 is connected to a summing device 16. Similarly, the real portion of the complex output of the multipliers 12 and 13 is connected to a summing device 17 and the imaginary portion is connected to a summing device 18. The outputs of the summing devices 15 and 17, both of which are real, are connected to a second level summing device 20. The outputs of the summing devices 16 and 18, both of which are imaginary, are connected to a second level summing device 21. The outputs of the summing devices 20 and 21 are real and imaginary components, respectively, of the dot product of the four component complex vectors X and Y applied to the inputs of the four multipliers 10 through 13. In the present embodiment the real output from the summing device 20 is applied to a latch circuit 24 and the imaginary output from the summing device 21 is applied to a latch circuit 25. The latch circuits 24 and 25 will temporarily store the signals supplied thereto in response to a signal at a control input thereof. In many instances during computations it is desirable to temporarily store the dot product output and the latches 24 and 25 are illustrated as one type of apparatus for performing this function.

Figure 2:
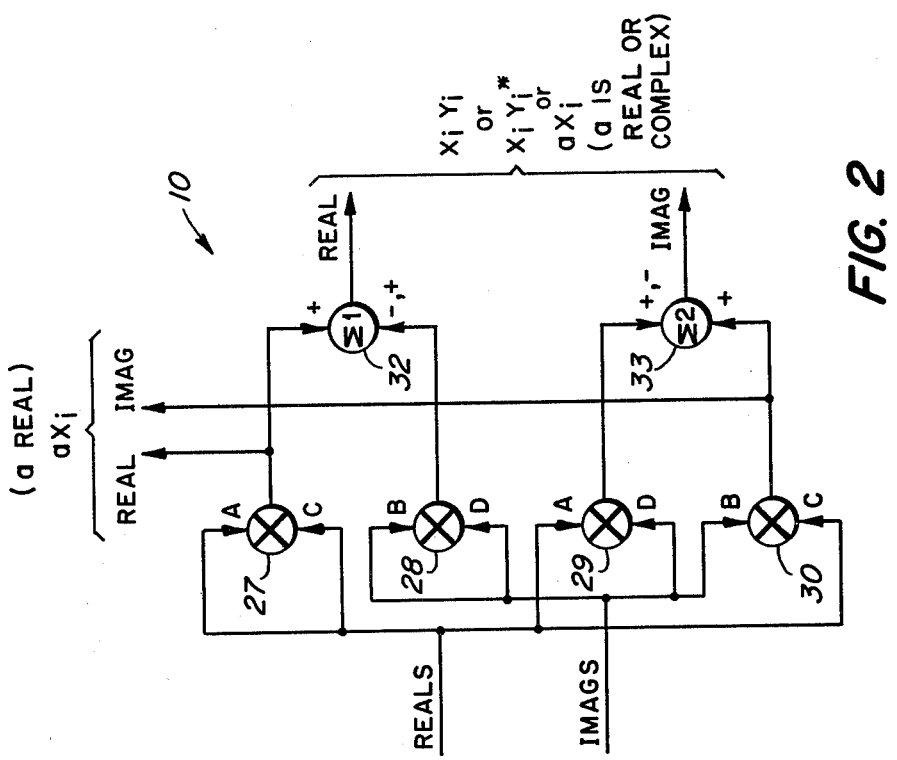
FIG. 2 is a more detailed block diagram of one of the complex multipliers of the apparatus illustrated in FIG. 1.

Since each of the complex multipliers 10 through 13 are substantially similar, only one of the complex multipliers, 10, will be described in detail. Referring to FIG. 2, a block diagram of the complex multiplier 10 is illustrated. The complex multiplier 10 illustrated in FIG. 2 has a single real and a single imaginary input and the components of the X and Y vectors are present on the same inputs at different times. By timing the signals, rather than providing separate inputs, the peripheral circuitry may be simplified considerably. The complex multiplier 10 includes four real multiplier circuits 27, 28, 29 and 30, each of which has two inputs and an output with timing circuitry not shown. The input lead carrying the real portion of the components of the vectors X and Y is connected to both inputs of the multiplying circuit 27, one input of the multiplying circuit 29 and one input of the multiplying circuit 30. The input lead carrying the imaginary portion of the components of the vectors X and Y is connected to both inputs of the multiplying circuit 28, one input of the multiplying circuit 29 and one input of the multiplying circuit 30.

For purposes of this description, the component of the complex vector X which is applied to the complex multiplier 10 may be described by the statement:

$$X = A + jB$$

also, the component of the complex vector Y which is applied to the complex multiplier 10 may be described by the statement:

$$Y = C + jD$$

As is well known in the art, A and C represent the real portions of the components and the jB and jD represent the imaginary portions. Referring again to FIG. 2, it can be seen that the multiplying circuit 27 (with the correct timing) has the real portion A at one input and the real portion C at the second input so that the product AC will appear at the output. Similarly, the multiplying circuit 28 provides the product BD at the output, the multiplying circuit 29 provides the product AD at the output and the multiplying circuit 30 provides the product BC at the output. In instances where the processing unit is utilized to multiply a real scalar, herein designated "a" for convenience, and a complex vector (X), the real scalar "a" will be applied to the real input line and no signal will be applied to the imaginary input line. Thus, the output of the multiplying circuit 27 will be aA and the output of the multiplying circuit 30 will be aB which translates into jaB. The multiplying circuits 28 and 29 will not have an output and, therefore, it can be seen that these signals are complete and can be used directly without further processing. Therefore, the output leads connected to the outputs of the multiplying circuits 27 and 30 are the direct outputs illustrated and described in conjunction with FIG. 1.

When it is desired to obtain a dot product from the complex multiplier 10 the output from the multiplying circuits 27 and 28 are applied to a combining circuit 32 and the outputs of the multiplying circuits 29 and 30 are applied to a combining circuit 33. The combining circuits 32 and 33 are constructed with switching circuitry so that during a first mode of operation the signal from the multiplying circuit 28 is subtracted from the signal from the multiplying circuit 27 and the signals from the multiplying circuits 29 and 30 are added. Upon proper activation of the switching circuit the combining circuits 32 and 33 convert to a second mode of operation wherein the signals from the multiplying circuits 27 and 28 are added and the signal from the multiplying circuit 29 is subtracted from the signal from the multiplying circuit 30. In the first mode of operation, assuming that the above described components of the complex vectors X and Y are applied to the inputs of the complex multiplier 10, the output from the combining circuit 32 will be (AC−BD) and the output from the combining circuit 33 will be j(BC+AD), which is the dot product of X and Y. In the second mode of operation the complex multiplier 10 operates as though the complex vector X is multiplied by the conjugate of the complex vector Y and the output from the combining circuit 32 is (AC+BD) and the output from the combining circuit 33 is j(BC−AD). By providing the switching circuitry which allows the conjugate of one of the complex vectors to be multiplied by the other complex vector, the need for 2's complement inversion of the imaginary part of Y is averted, which greatly simplifies the apparatus.

Figure 3:
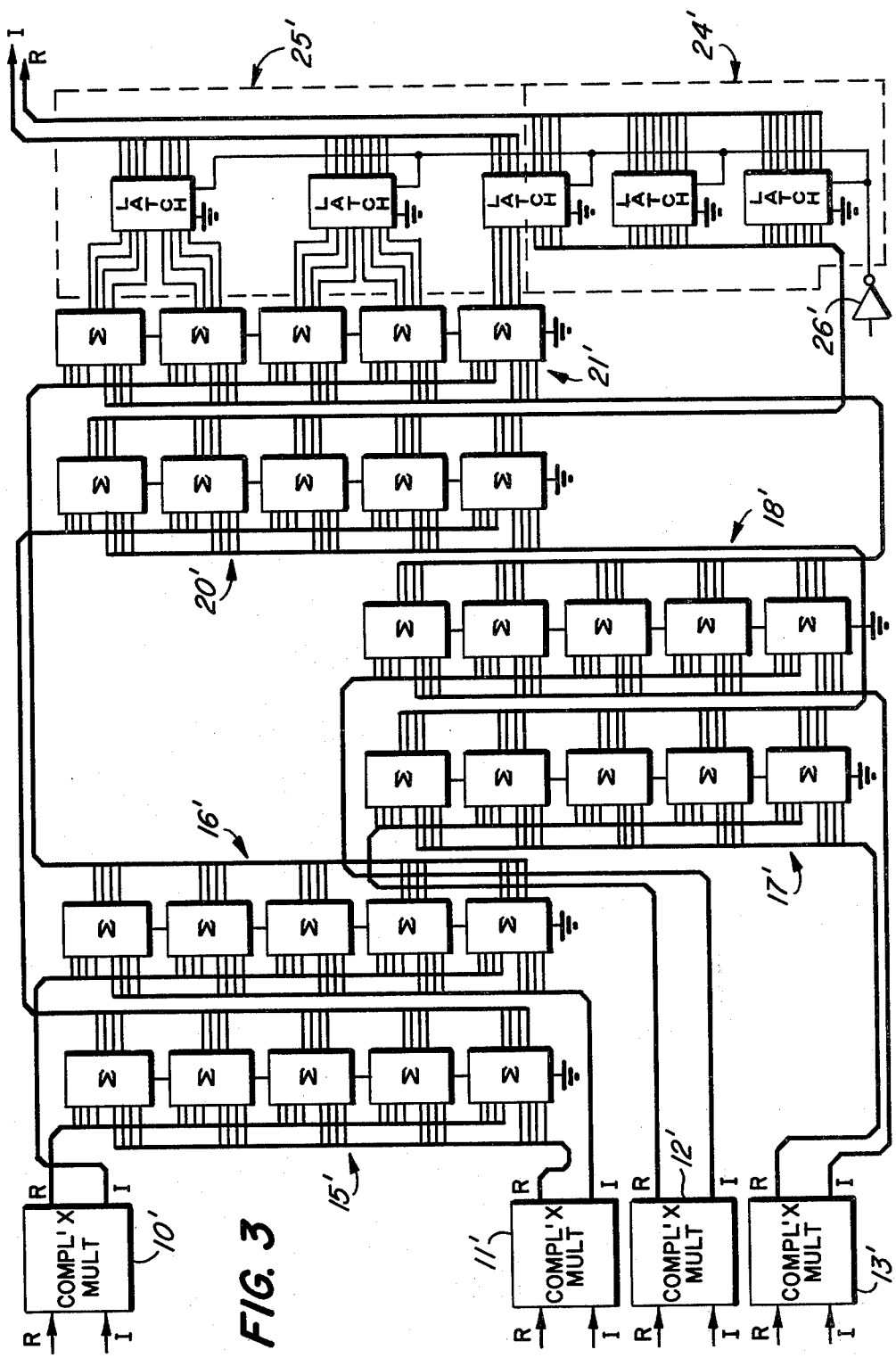
FIG. 3 is a detailed schematic of a digital processing unit.

Referring to FIG. 3, a specific embodiment of the processing unit, described generally in conjunction with FIG. 1, is disclosed. The processing unit illustrated in FIG. 3 is again constructed for four component complex vectors and is a digital embodiment wherein each real and imaginary portion of each component consists of sixteen bits applied in parallel. It will, of course, be understood that any number N, which is a positive integer greater than zero, of components and any number m of bits may be utilized to represent the complex vectors X and Y and the numbers used herein are simply for purposes of example. In FIG. 3 components similar to those described in FIG. 1 will be designated with a similar number and a prime will be added to indicate the different embodiment.

Four complex multipliers 10', 11', 12' and 13' are connected to four summing circuits 15', 16', 17' and 18'. Each real and imaginary output from each of the complex multipliers 10' through 13' includes twenty parallel leads for supplying the bits of information representative of the output vector and a polarity representation. Each of the summing devices 15' through 18' include, in this embodiment, five 4-bit adders each having eight input leads and four output leads, which 4-bit adders may be commercially available IC circuits sold under the number 74S283. The twenty leads in the real output of the complex multiplier 10' are divided into five groups of four leads with a different group connected to four of the input leads of each of the 4-bit adders in the adding device 15'. Similarly, the twenty leads in the real output of the complex multiplier 11' are divided into five groups of four leads and connected to the remaining four inputs of each of the 4-bit adders in the adding device 15'. In a similar fashion the imaginary outputs of the complex multipliers 10' and 11' are connected to the five 4-bit adders of the adding device 16', the real outputs of the complex multipliers 12' and 13' are connected to the five 4-bit adders of the adding device 17' and the imaginary outputs of the complex multipliers 12' and 13' are connected to the five 4-bit adders of the summing device 18'. The second level summing devices 20' and 21' are formed in a similar fashion and the twenty output leads of each of the summing devices 15' and 17' are connected to the inputs of the summing device 20' in a similar fashion. Similarly the twenty output leads of each of the summing devices 16' and 18' are connected to the inputs of the summing device 21'.

It should be noted that each time a level of addition occurs one more bit must be added to the output number to fully represent the magnitude of the number. For example, if the real portion of the component at the output of the complex multiplier 10' is represented by a seventeen bit number and the real portion at the output of the complex multiplier 11' is represented by a seventeen bit number the output from the summing device 15' must have at least eighteen bits. Also, if the output from the summing device 15' has eighteen bits and the output from the summing device 17' has eighteen bits the output from the summing device 20' must have nineteen bits to fully represent the magnitude of the number. Therefore, in the present embodiment twenty leads are utilized to carry the bits representing the number, which provides a spare lead for the polarity indicator.

The twenty output leads from the summing device 20' are applied to two and one-half latch circuits, each of which is an IC circuit having eight inputs and eight outputs and may be, for example, an IC circuit commercially available and designated 74LS377. The twenty leads from the summing device 21' are applied to two and one-half latch circuits, designated 25'. Each of the five latch circuits 24' and 25' have an input connected to a buffer circuit 26' and adapted to receive a signal for controlling the five latch circuits.

Referring to FIG. 4, one of the complex multipliers, for example, 10', is illustrated in detail and components similar to the components in the detailed block diagram of FIG. 2 will be designated with similar numbers having a prime added to indicate the different embodiment. The complex multiplier of FIG. 4 is a digital multiplier and the real and imaginary inputs each include sixteen leads for supplying a 15-bit word and a polarity indicator in parallel to four real multipliers 27', 28', 29' and 30'. In this embodiment the real multipliers 27' through 30' are commercially available IC circuits designated MPY16HJ, but it will be understood by those skilled in the art that other multipliers might be utilized and these are disclosed only for purposes of example. Three clock signals are supplied to the complex multiplier by way of three buffer circuits 40', 41' and 42'. The clock pulses applied through the buffer 40' latch the correct component of the complex vector X into the real multipliers at the correct time, the clock pulses applied through the buffer 41' latch the correct component of the complex vector Y into the real multipliers at the correct time and the clock pulses applied through the buffer 42' clock an output out of the real multipliers after the computation has occurred. The real multiplier 27' provides an output representative of the product AC, as previously described. Similarly the real multiplier 28' provides a signal representative of the product BD at the output, the real multiplier 29' provides a signal representative of the product AD at the output and the real multiplier 30' provides a signal representative of the product BC. The outputs of each of the real multipliers 27' through 30' include sixteen leads, fifteen of which carry parallel bits representative of the magnitude of the output number and one of which is a polarity indicator. In general, when multiplying an M-bit number by an M-bit number, a 2M bit product is formed, i.e. in the real multipliers 27' through 30' the two 16-bit inputs form a 32-bit product. However, in the present embodiment only the 16 most significant bits are used. It will be understood by those skilled in the art that all 32 bits might be utilized if the additional accuracy and non-scaled dot product are desired.

The outputs of the real multipliers 27' and 28' are connected to a combining circuit 32' and the outputs of the real multipliers 29' and 30' are connected to a combining circuit 33'. Each of the combining circuits 32' and 33' include five arithmetic logic units and a high speed look ahead unit which operate as a single unit. In the present embodiment the five arithmetic logic units are situated in a line to receive the inputs from the real multipliers in the correct order and distributed across the five units. As an example of a complete and operable combining circuit the arithmetic logic units at the opposite ends of the line are 25LS2517 IC circuits and the three arithmetic logic units therebetween are 25LS381 IC circuits while the high speed look ahead is an AM2902 IC circuit designed to operate therewith. The specific interconnections of the IC circuits forming the combining circuit will not be described in detail since these units are commercially available and designed to be connected to provide the functions specified herein. The fifteen leads carrying the parallel bits from the real multiplier 27' and the fifteen leads carrying the parallel bits from the real multiplier 28' are connected to the inputs of the five arithmetic logic units and the sixteenth lead from each of the real multipliers 27' and 28', carrying the polarity indicator, are connected through gates 45' and 46', respectively, to the first two arithmetic logic units in the line. Similarly the fifteen leads from each of the real multipliers 29' and 30' are connected to the five arithmetic logic units in the combining circuit 33' and the sixteenth leads are connected through gates 47' and 48', respectively. In the present embodiment the gates 45', 46', 47' and 48' have one input grounded so that they always pass the polarity indicator but they are included in the circuit to provide a buffering action. Two inverters 50' and 51' are connected in series with the outputs of each of the inverters connected to each of the combining circuits and the input adapted to receive a mode control signal. The inverters 50' and 51' operate to switch the combining circuits 32' and 33' between the first mode, wherein a standard dot product of two complex vectors is obtained at the output, and a second mode wherein a dot product of a vector and the conjugate of a second vector are obtained at the output. With the inverters 50' and 51' as illustrated a "one" at the control input provides the first mode of operation and a "zero" at the control input provides the second mode of operation.

While FIGS. 1 and 3 illustrate digital processing units each having four complex multipliers and summing means for combining pairs of outputs from pairs of complex multipliers or previous pairs of summing means, it should be understood that a single complex multiplier followed by successive accumulation could be utilized if the slower operation is acceptable. In this case the various inputs would be applied to the complex multiplier at predetermined times to produce the desired products. The various products would then be combined by accumulation and storage.

Thus, a processing unit is disclosed for multiplying mathematical quantities such as two N component complex vectors, said processing unit being essentially a complex dot product device. Through the variations in outputs and the two modes of operation of the complex multipliers, the processing unit can perform matrix-vector multiplications, determine the square magnitude of a given vector and carry out a real-scalar multiplication of a complex vector. In addition to performing the normal dot product multiplication of two complex vectors, the complex multipliers can actually compute the product of a complex vector and the conjugate of a complex vector. With this technique, the need for 2's complement inversion of the imaginary part of the conjugated complex vector is averted. Further, the entire processing unit can be constructed in digital form using IC chips that are readily available. Further, by operating on the words in parallel, as disclosed in one embodiment, the processing unit is extremely fast.

While we have shown and described a specific embodiment of this invention, further modifications and improvements will occur to those skilled in the art. We desire it to be understood, therefore, that this invention is not limited to the particular form shown and we intend in the appended claims to cover all modifications which do not depart from the spirit and scope of this invention.

We claim:

1. A digital processing unit for multiplying two N-component mathematical quantities, X and Y, wherein each component is represented by an m bit digital word representative of a real portion and an m bit digital word representative of an imaginary portion, said unit comprising:
    (a) N complex multipliers each having an X input and a Y input, each input having m leads adapted to receive the real portion in parallel and m leads adapted to receive the imaginary portion in parallel, and an output having at least m+1 leads for the real portion and at least m+1 leads for the imaginary portion;
    (b) real portion summing means connected to the m+1 leads for the real portion at the output of each of said N complex multipliers for providing a real output component including at least m+2 parallel bits representative of the sum of the real portions from each of said complex multipliers; and
    (c) imaginary portion summing means connected to the m+1 leads for the imaginary portion at the output of each of said N complex multipliers for providing an imaginary output component including at least m+2 parallel bits representative of the sum of the imaginary portions from each of said complex multipliers.

2. A digital processing unit as claimed in claim 1 wherein the N-component mathematical quantities, X and Y, are applied to each of the X and Y inputs of the N complex multipliers by means of a single 2mN-lead bus which first brings in X and latches it into the individual multipliers and subsequently Y.

3. A digital processing unit as claimed in claim 1 wherein each of the N-complex multipliers includes four multiplier circuits, the real and imaginary portions of the X and Y components being defined by the statements $X=(A+jB)$ and $Y=(C+jD)$, with the multiplier circuits being connected to provide the products AC, BD, AD and BC at the outputs thereof, and two combining circuits connected to the four multiplier circuits to provide m+1 bit output words representative of the statements (AC−BD) and j(BC+AD) respectively.

4. A digital processing unit as claimed in claim 3 wherein the two combining circuits include switching apparatus for controlling the manner of combining the input words to provide m+1 bit output words representative of the statements (AC+BD) and j(BC−AD) when properly activated.

5. A digital processing unit for multiplying two mathematical quantities, X and Y, wherein the number X is represented by an m bit digital word, A, representative of a real portion of an m bit digital word, jB, representative of an imaginary portion of the number Y is represented by an m bit digital word, C, representative of a real portion and an m bit digital word, jD, representative of an imaginary portion, the processing unit comprising:
    (a) four multiplier circuits connected to receive the m bit digital words and provide output words representative of the products AC, BD, AD and BC, respectively;
    (b) real portion combining circuitry connected to two of said four multiplier circuits to receive the products AC and BD and provide at least an m+1 bit output word representative of the statement (AC−BD);
    (c) imaginary portion combining circuitry connected to the remaining two of said four multiplier circuits to receive the products AD and BC and provide at least an m+1 bit output word representative of the statement j(BC+AD); and
    (d) switching apparatus included in said real portion and imaginary portion combining circuitry for controlling the manner of combining the input signals to provide m+1 bit output words representative of the statements (AC+BD) and j(BC−AD) when properly activated.

6. A processing unit for multiplying two methematical quantities, X and Y, wherein the quantity X is represented by an electrical signal, A, representative of a real portion and an electrical signal jB, representative of an imaginary portion and the quantity Y is represented by an electrical signal C, representative of a real portion, and an electrical signal jD, representative of an imaginary portion, the processing unit comprising:
    (a) four multiplier circuits connected to receive the electrical signals and provide output signals representative of the products AC, BD, AD and BC, respectively;
    (b) real portion combining circuitry connected to two of said four multiplier circuits to receive the product signals AC and BD and provide an output signal representative of the statement (AC−BD);
    (c) imaginary portion combining circuitry connected to the remaining two of said four multiplier circuits to receive the product signals AD and BC and provide an output signal representative of the statement j(BC+AD); and
    (d) switching apparatus included in said real portion and imaginary portion combining circuitry for controlling the manner of combining the input signals to provide output signals representative of the statements (AC+BD) and j(BC−AD) when properly activated.

* * * * *